Dec. 22, 1942.   W. PARK   2,305,894
TELLURIAN
Filed Oct. 28, 1940   3 Sheets-Sheet 1
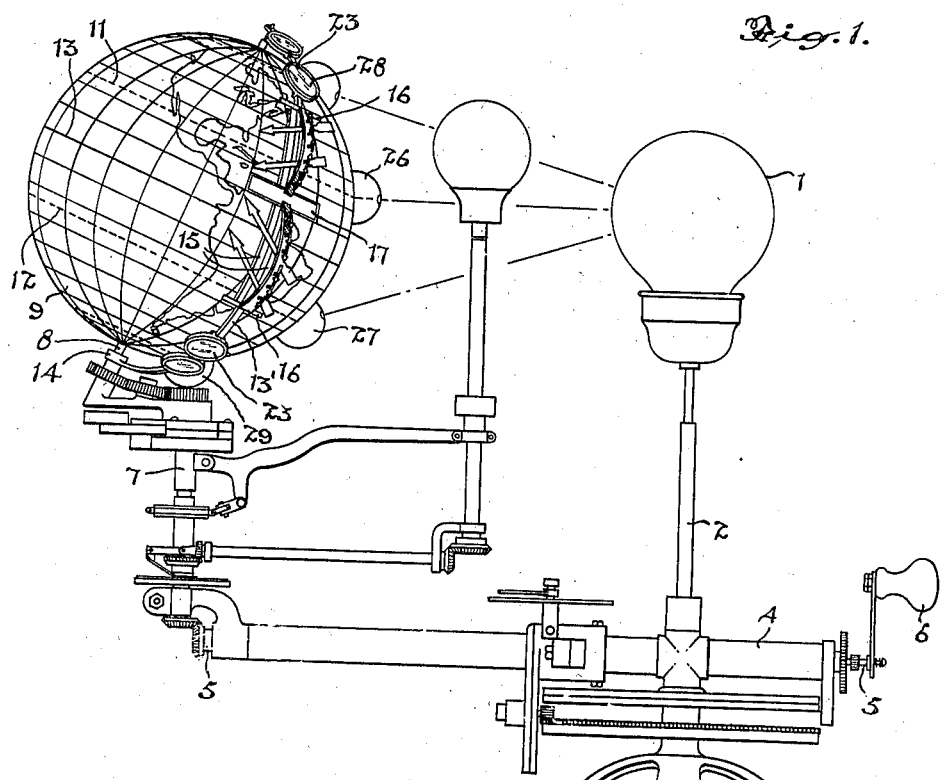
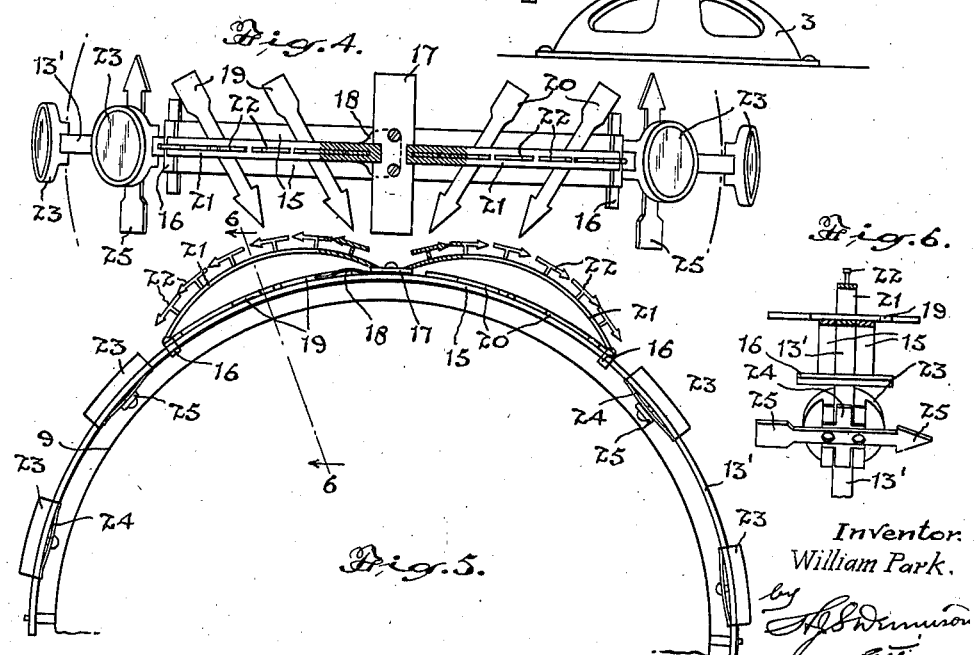
Inventor.
William Park.

Dec. 22, 1942.  W. PARK  2,305,894
TELLURIAN
Filed Oct. 28, 1940  3 Sheets-Sheet 2

Inventor.
William Park.

Dec. 22, 1942.  W. PARK  2,305,894
TELLURIAN
Filed Oct. 28, 1940  3 Sheets-Sheet 3

Inventor.
William Park.

Patented Dec. 22, 1942

2,305,894

UNITED STATES PATENT OFFICE 2,305,894

TELLURIAN

William Park, Toronto, Ontario, Canada, assignor to Rudolf Dunbar, Toronto, Ontario, Canada Application October 28, 1940, Serial No. 363,177

8 Claims. (Cl. 35—45)

This invention relates to devices particularly adapted for demonstrating the relative movements of the sun, earth and moon, and particularly to show the relationship between the earth and the sun at certain periods of the year, and the principal objects of the present invention are to provide a means for clearly illustrating the co-relation between the movements of the earth and sun and the resultant general circulation of air over the earth's surface and the effects of such on various portions of the earth's surface.

A further object is to provide means for illustrating visually the position of the sun in relation to different portions of the earth's surface at different periods of the year.

The principal features of the invention consist in the novel construction and arrangement of an arc-shaped guide member to be mounted superficially in relation to the periphery of a globe and upon which is slidably mounted an indicator which illustrates the relativity of the air currents created by the shifting heat equator.

A further important feature consists in the novel arrangement of reflective hemispheres attached to the earth's surface at selected points to indicate the relatively visible position of the sun.

In the accompanying drawings Figure 1 is a side elevational view of an apparatus constructed in accordance with this invention showing the wind indicating device mounted in relation to the globe.

Figure 4 is an enlarged plan view of the wind indicator.

Figure 5 is an enlarged side elevational view of the wind indicator.

Figure 6 is a cross section on the line 6—6 of Figure 5.

Figure 2:
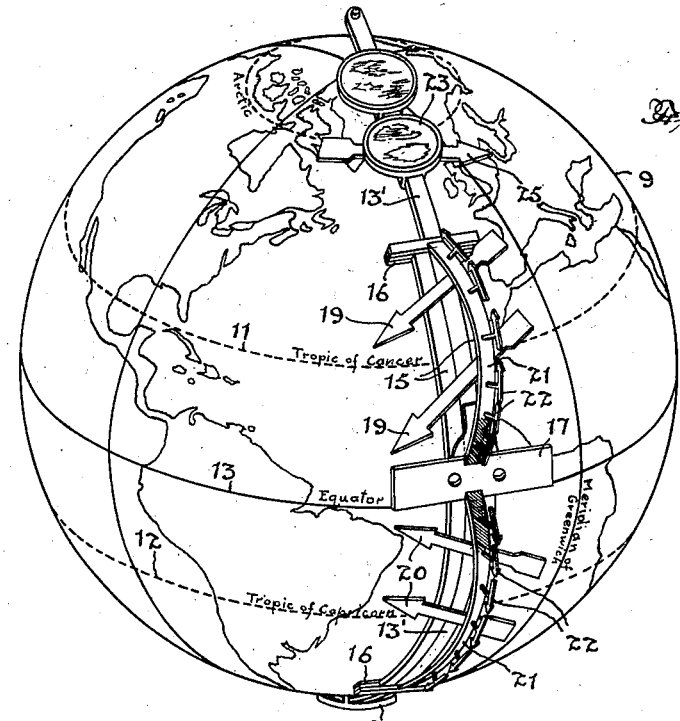
Figure 2 is an enlarged elevational view of the globe shown with its axis tilted toward the observer and indicating the relative positions of the equator and the tropics, the wind indicator being shown thereover and illustrating the movement of the trade winds.

Tellurian devices for the purpose of illustrating the relative positions of the sun, earth and moon at different periods of the year and which are moved by means of co-ordinated gear mechanisms and locating devices are known, and while such devices assisted very materially in the realistic understanding of geography, particularly in relation to the sun and the relative rotation of the earth upon its axis and of the earth about the sun in its movement in the solar system, it has been found desirable to apply more definite illustrative media to indicate the peculiar phenomena resulting from the varying positions of the vertical rays of the sun in relation to the earth's surface.

In the operation of the tellurian an illuminated globe 1 representing the sun is mounted upon a standard 2 supported by a base 3. Rotatably mounted on the standard 2 above the base is a horizontal tubular support 4 through which a shaft 5 extends and which is operated by a crank 6. This crank shaft is connected with suitable gearing which rotates the tube 4 about the axis of the standard supporting the sun. At the outer end of the tube 4 is arranged a vertical structure 7 on the top of which is mounted in an angular position the axial shaft 8 which supports the earth globe 9. The axial shaft is connected by suitable gearing with the shaft 5 to rotate the earth about the angularly positioned axis 8 at a speed proportional to the speed of rotation of the tube 4 carrying the earth globe bodily about the sun's axis. This gear mechanism and the actual structure of the relative sun and earth support as well as that of the moon globe, is not a part of the present invention but has been known.

It will be seen on reference to Figure 1 that with the axis of the earth inclined in the direction indicated, the vertical rays of the sun strike the earth's surface substantially at the Tropic of Cancer indicated by the dotted line 11, and it will be readily appreciated that when the position of angularity of the earth's axis 8 is moved into the directly opposite position to that shown, the vertical rays of the sun will strike the earth's surface at the dotted line 12 indicating the Tropic of Capricorn.

It will also be understood that in the transition of the seasons and the travel of the vertical rays of the sun from the northly limit of the Tropic of Cancer to the southerly limit of the Tropic of Capricorn, and vice versa, the vertical rays of the sun will cross the equator, represented by the line 13, twice, within a period representative of one year.

It will therefore be readily appreciated that the effect of the sun's rays striking vertically at two periods in the year on the equatorial line will establish a highly heated zone which is here termed a "heat equator." This zone extends five degrees or more both north and south of the equatorial line.

It is well understood by students of physical geography that the effect of the concentrated vertical sun's rays on a certain belt of the earth's surface is to highly heat the air above that surface, with the result that a vast column of air is caused to rise from this "heat equator" which moves north and south of the actual equatorial line. This vast movement directly upward of heated air causes an inflow of air from outer positions.

In order to indicate this air flow in relation to the "heat equator" I have provided an arc-shaped bar 13' which is provided with a hub member 14 adapted to encircle the bearing supporting the earth's axis member 8. This arc-shaped bar is spaced a short distance from the surface of the earth globe 9 and extends up over the upper end of the axis or over the North Pole.

A pair of narrow bars 15, curved to correspond to the curvature of the bar 13', are arranged either side thereof and these are connected together at the ends by double crossbars 16, as illustrated particularly in Figure 6, thus forming a sliding guide member mounted on the bar 13'.

Intermediate of the length of the bars 15 there is secured thereto a broad crossbar 17, which is intended to represent the zone of the "heat equator," and a small friction bow spring 18, which comprises a spring friction member, holds the slidable member in adjusted positions on the bar 13'.

Mounted upon the paired bars 15 and extending over the bar 13' at the upper side of the "heat equator" 17 is a pair of arrows 19. These are set in a substantially parallel position pointing inward toward the "heat equator." A similar pair of arrows 20 are arranged at the other side of the "heat equator" and also point inwardly toward the "heat equator." These arrows extend beyond either side of the indicator member and are intended to represent the direction and relative position of the trade winds in respect to the "heat equator" and they move in unison with the member slidably mounted on the bar 13.

A pair of narrow arched strips 21 extend from the "heat equator" cross bar 17 to the end cross bars 16 above the bar 13' and upon these are mounted a plurality of small arrows 22 and these indicate the movement of air away from the "chimney" area of the "heat equator," as will be hereinafter more fully described.

Other indicator members may be arranged to slide upon the bar 13' to carry indexes of weather or moisture conditions of the atmosphere into positions beyond the end bars 16 of the member slidably mounted on the bar 13'. These are preferably in the form of discs 23 held in their relative positions by means of bow springs 24, and mounted on the back of these discs and extending transversely of the bar 13' are arrows 25, the purpose of which will be also hereinafter described.

Figures 7, 8, 9:
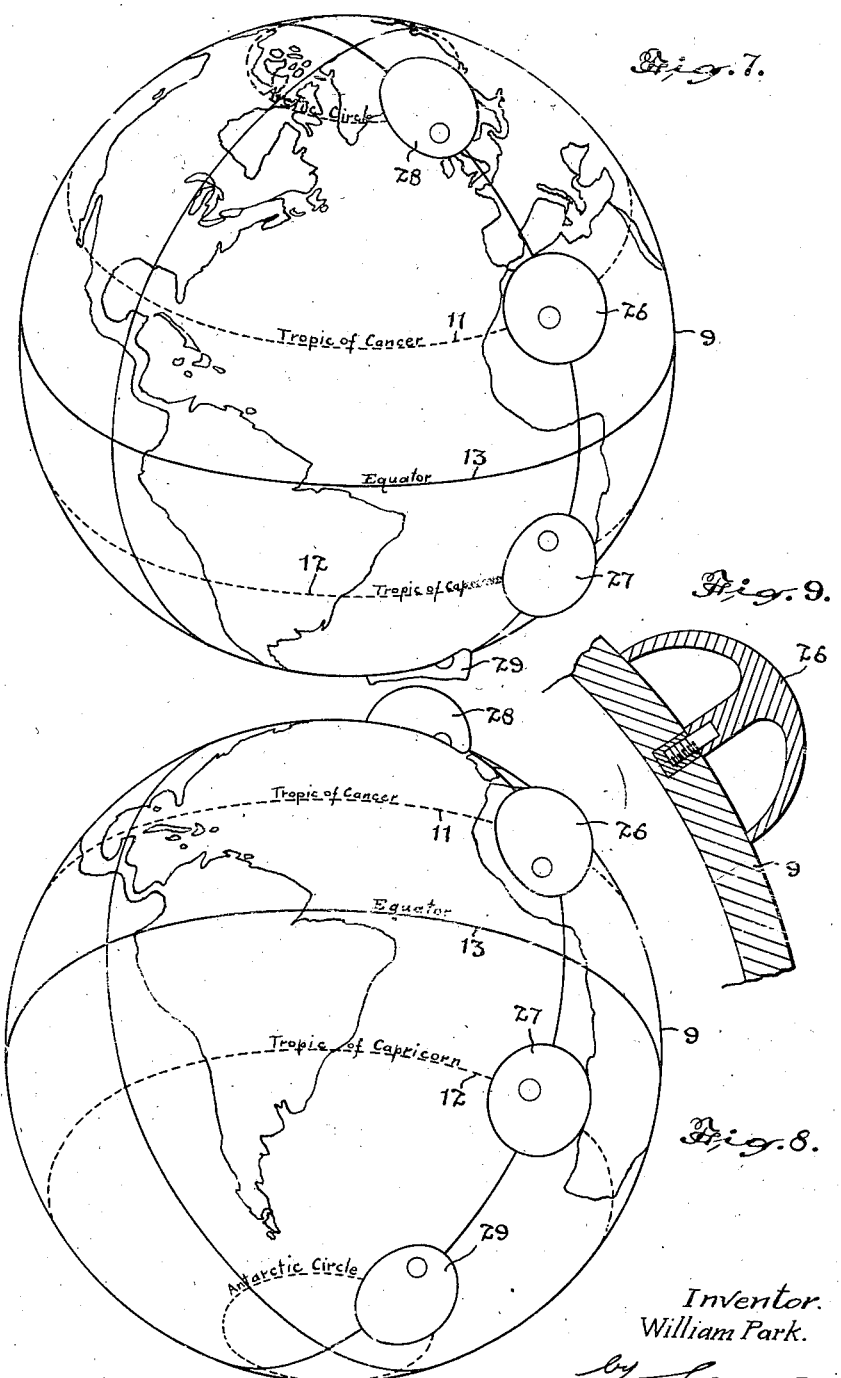
Figure 7 is an elevational view of the globe as illustrated in Figure 2 showing the arrangement of hemispherical reflectors placed on various points of the earth's surface to indicate the position of the sun as viewed from those positions.
Figure 8 is a view similar to Figure 7 with the globe's axis tilted away from the observer.
Figure 9 is an enlarged sectional detail of one of the hemispherical reflectors.

In the illustration shown in Figure 1 a plurality of hemispherical reflector members 26, 27, 28 and 29 are arranged respectively in position on the Tropic of Cancer, the Tropic of Capricorn, the Arctic Circle and the Antarctic Circle, and these reflectors reflect a small image of the sun globe and they indicate the position of the sun globe as the sun will be seen vertically from the different tropics and arctic circles as the earth revolves on its axis and about the sun. These reflector members are shown arranged upon the first meridian but they may be placed in any desirable representative position on the surface of the globe. Figures 7 and 8 particularly illustrate the relative positions of the reflective images of the sun globe, in Figure 7, as in Figure 1, when the Tropic of Cancer is receiving the vertical rays of the sun at midsummer as represented by the member 26 and in Figure 8 the vertical rays of the sun are being directed to the Tropic of Capricorn as represented by the member 27.

It will be noted on reference to these figures that in Figure 7 the dotted line of the Tropic of Cancer appears to the observer to pass through the centre of the circle of the globe, while in Figure 8 the Tropic of Capricorn appears to the observer to pass through the centre of the globe.

The relationship of the vertical rays of the sun and the area bounded by or bordering on the tropics is the most important phase of the whole world's life, which, due to the angularity of the axis of the earth in relation to the orbit of the earth around the sun, shifts the vertical rays from tropic-to-tropic and it will be apparent that due to this condition the vertical rays of the sun cross the equator 13 at two periods during the year, thereby directing heat rays to an equatorial belt twice a year which are very intensive.

The result of this phenomenon is that from this intensively heated belt of the earth's surface, or what we have termed the "heat equator," there is continually rising a "chimney" of hot air directly upward for a remarkable distance until, becoming cold by contact with the upper atmosphere, it spreads to north and south and this spread is indicated by the arrows 25 extending north and south from the "heat equator" representation 17.

This intensive upward flow of a "chimney" of air from the "heat equator" causes an inflow of air which has become known as the trade winds and the locale of these trade winds shifts in accordance with the shifting of the "heat equator."

It will be appreciated that the concentrated sun's rays at the "heat equator" has the effect of evaporating extensive quantities of water over the ocean areas and the water-laden air upon rising and coming into contact with the cooler outer atmosphere is precipitated so that there is an excessive rainfall in the tropical areas. This is represented by the line-shaded portions of the arched strips 21 and 22 extending from the "heat equator" 17. These arched strips terminating at the cross bars 16 and curving downward thereto indicate that the air rising from the "heat equator" and heavily laden with water is freed from its water by precipitation in the zones adjacent to the "heat equator," and then moving northward and southward these upper strata of air become drier and cooler and eventually come down close to the earth's surface, thus giving us the dry cool climates in the north and south temperate zones.

The individual indicator discs 23, slidably mounted on the bar 13', are here shown containing pictures representing the prevailing atmospheric condition in the temperate zones. These will shift, not only directly in accordance with the shifting of the "heat equator" and therefore the shifting of the trade winds, but they may be shifted in respect to the "heat equator" in accordance with whether they be over land or over the seat at any given time. Thus for example when over the Atlantic Ocean a certain representative position may be chosen for the discs 23 whereas when overlying, for example the North American Continent, a different representative position may be chosen in keeping with well established statistics. Other discs of a similar nature are arranged to the north and south of the inner discs and these will advantageously contain pictures representing the clouds and atmosphere formations in the Arctic region which is represented by cloud effects characteristic of certain conditions encountered in these zones.

The disc members 23 are provided with arrows 25 which, as illustrated in Figure 4, point in an oppositional direction to the arrows 19 and 20 and show the predominant wind directions in the regions north and south of the temperate zones due to the evacuation of air from areas that precede the trade winds.

An instrument constructed as herein described enables the teaching of geography in such a manner that the student can readily assimilate certain known facts in respect to climate and the resultant effects on the habits, customs and industries of the various peoples inhabiting the various zones of the earth's surface. For instance, with the earth's axis inclined, as illustrated in Figures 1, 2 and 7, the image of the sun reflected on the hemispherical reflector 26 mounted over the Tropic of Cancer, on the twenty-first of June appears to the observer to directly overlie the Tropic of Cancer thereby representing the sun as practically directly overhead. The arrows 19 indicate the direction of the trade winds, which, crossing a vast expanse of ocean, subjected to the intensive vertical rays of the sun, become heavily laden with moisture and these, striking across the Continent of South America, carry with them intensive rains which are finally precipitated by contact with the very high mountain range of the Andes, thereby producing the vast Amazon River, with all its tributaries, in an intensely tropical area.

Figure 3:
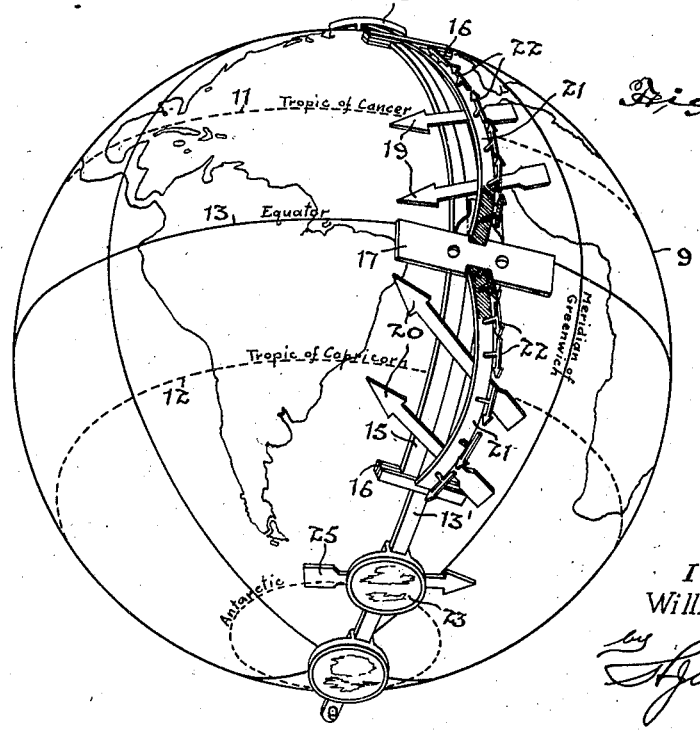
Figure 3 is a view similar to Figure 2 showing the axis of the earth tilted away from the observer at the north and indicating the relative positions of the equator and tropics and showing the relation of the trade winds thereto.

These winds after passing over the Andes are still warm but dry and produce a climate along the Chilean coast of South America very similar to the climatic conditions of the Mediterranean countries. Conversely, when the earth and sun are in the relative positions, as illustrated in Figures 3 and 8, the south trade winds crossing the vast area of the South Atlantic and South Pacific carry heat and moisture to South America and Africa, while the northerly trade winds carry cooler temperatures to the northerly parts of these continents.

Students by the use of this device can be made to readily understand how certain classes of vegetation thrive in certain areas of the earth, which are separated by vast distances but owe their similarities to the conditions of winds which are effected by the position of the sun's rays in relation to the earth equator.

It must be understood of course in respect to the present invention that it is used in conjunction with an apparatus which has been known and which, by the turning of the crank 6, rotates the earth upon its axis and coincidentally, swings the earth in its orbit around the sun in its exact relationship through the period of one year, and by the reflection of the rays of the sun will be seen to have a definite relationship with the alternately advancing and receding of portions of the earth's surface from the snow line, and it will be readily shown how the seasons change from summer to winter and winter to summer and how days are alternately lengthened and shortened.

The additional feature which has been added by the present invention of a definite active means to illustrate the movement of air currents over the various portions of the globe brings about an extremely desirable result in the use of the device as a practical means for demonstrating these natural phenomena.

A very clear explanative basis of the "heat equator," the trade wind belts, the high pressure belts, the west wind belts, the polar caps, the Mediterranean climates, oceanic climates, continental climate, monsoon climate, monsoon winds and the changes of the monsoon is thus afforded by the shifting of the slidable wind indicator in accordance with the position of the earth in its relation to the sun.

What I claim as my invention is:

1. The combination with the earth globe mounted to be rotated around the representation of the sun and to be rotated on its axis, of means for indicating the movement of air currents responsive to the various relative positions of the earth and sun, including a band curved about the globe from north to south, and air current indicating arrows mounted in transverse convergent angular positions on said band for adjustment longitudinally thereof.

2. The combination with the earth globe mounted to be rotated around the representation of the sun and to be rotated on its axis, of reflector means detachably mounted on the earth globe for indicating the relative angularity of the sun's rays in respect to the earth's surface.

3. The combination with the earth globe mounted to be rotated around the representation of the sun and to be rotated on its axis, of a bar mounted on the support of the earth globe and curved to conform with the curvature of the earth globe from north to south, a member slidably mounted on said curved bar having means arranged medially of its length to represent an intensive heat zone of the earth's surface, two series of small arrows extending from said zone indicator respectively north and south in arched paths to indicate directionally the upward and outward flows of air from the equator, converging sets of larger arrows mounted on the slidable member in transverse angular relation to indicate the directional flows of the trade winds, and means for simultaneously adjusting all of said arrows longitudinally on said curved bar.

4. The combination with the earth globe mounted to be rotated around the representation of the sun and to be rotated on its axis, of a bar mounted on the support of the earth globe curved to extend in a north-south direction adjacent to the earth's surface, a member longitudinally slidable on said bar the extremities of which represent the location of the temperate zones on the earth's surface, a member transversely mounted on said slidable member midway of its length and representing an intensive heat zone or "heat equator," a pair of bars extending from the "heat equator" representation to the ends of the slidable member and representing the upward and outward paths of travel of the heated air rising from the "heat equator," said curved bars being marked to indicate the intensive wet zones of the tropics due to the heavy condensation of moisture lifted from oceanic areas of the earth's surface, and arrows rigidly mounted on said sildable member and angularly crossing same pointing inwardly toward the "heat equator" and indicating the direction of the trade winds, the whole being shiftable on the curved bar to indicate the different positions of these winds in response to the alteration of the angularity of the earth's axis at certain periods of the year.

5. A device as claimed in claim 4 having indicator devices separate from the central slidable member mounted on said curved bar adapted to be adjusted on said bar relative to the adjustment of the central member to indicate zones of climatic conditions of the earth's surface.

6. In a device as claimed in claim 4, a plurality of disc members slidably mounted on said curved bar and spring-held in adjusted positions and bearing pictorial or other indications of weather conditions as an indication of weather conditions in certain zones on the earth's surface at certain periods of the year.

7. The combination of the earth globe mounted to be rotated around the representation of the sun and to be rotated on its axis, a guide member curved to correspond to the curvature of the earth's surface, and means slidably mounted on said guide member adapted to be moved over the earth's surface north and south to indicate relative to the position of the sun the relative movement of wind currents over the surface of the earth.

8. The combination of the earth globe mounted to be rotated around the representation of the sun and to be rotated on its axis, hemispherical reflector means mounted on the surface of the earth globe in alignment from north to south respectively at the Tropic of Cancer, the Tropic of Capricorn, the Arctic Circle and the Antarctic Circle to reflect the image of the sun globe and to indicate the relative position of the sun to the earth at different periods of the year.

WILLIAM PARK.